3,084,052
ASEPTIC MILK SHAKE PRODUCT AND METHOD OF PRODUCING SAME
George F. McLaughlin, 45 Ketch Road, Newport Beach, Calif.
No Drawing. Filed Feb. 20, 1959, Ser. No. 794,494
2 Claims. (Cl. 99—189)

This invention relates to a new food product. More particularly, the invention relates to an aseptically bottled or canned dairy product in the form and composition of a conventional milk shake and to a method of milk shake preparation.

In conventional practice, a milk shake is made by mixing desired portions of fresh milk, ice cream and flavoring together to provide a chilled, relatively aerated beverage adapted for immediate consumption. Milk shakes may be made with widely varying recipes to provide relatively thicker or thinner beverage consistencies and/or relatively richer or leaner butter fat and other food content. Thus, for example, a typical iced milk shake prepared in accordance with techniques familiar to the industry may consist of the approximate formula:

| Ingredient | Percentage by Weight |
|---|---|
| Butterfat | 4.1%. |
| Milk-solids-not-fat | 9.2%. |
| Sucrose | 6.7%. |
| Corn Syrup Solids | 1.6%. |
| Stabilizer-emulsifier | .5% max. |
| Color | Appropriate quantity as desired. |
| Flavoring | Do. |
| Water | 75% (approx.). |

A richer formula, and one perhaps more in line with the type of milk shakes mixed in soda fountains and ice cream parlors might typically have the following formula:

| Ingredient | Percentage by Weight |
|---|---|
| Butterfat | 7.1%. |
| Milk-solids-not-fat | 9.1%. |
| Sucrose | 11.3%. |
| Stabilizer-emulsifier | .5% max. |
| Flavoring | Appropriate quantity as desired. |
| Color | Do. |
| Water | 70% (approx.) |

It is generally accepted in the dairy field that a freshly mixed milk shake should contain about a 65% overrun. By overrun is meant the percentage by volume of the entire milk shake which is constituted by air or other gas and by far the largest part of which gas is incorporated in the body of the milk shake in the form of air bubbles. In a normal milk shake, if the beverage is allowed to stand for any period of time, the solid food content will settle into a denser form and a large proportion of the air content will escape.

It has been proposed in the past to mix milk shakes both by hand as well as in mechanical mixers. In either case, proper facilities must be kept on hand to maintain the ice cream refrigerated in solid form—a temperature of 24° F. being considered optimum for this purpose. Insofar as I am aware, no fresh dairy milk shake product has been heretofore developed which could be readily packaged and stored at room temperature for future chilling at the time of customer consumption.

A principal object of the present invention is to provide an aseptically canned or bottled fresh dairy milk shake product which has a long shelf life at room temperatures, and which, after being chilled, shaken and opened, provides a beverage which is substantially indistinguishable in taste consistency and texture from a conventional freshly made or machine mixed milk shake such as conventionally served at ice cream parlors and soda fountains.

More specifically, the embodiment of the invention to be herein described comprises in combination a sterile aseptically sealed container partially filled with a substantially sterile liquid milk shake mix. A head space between the liquid level and upper closure seal of the container is established, and this head space is normally occupied by a substantially tasteless and odorless non-oxidizing gas, such as nitrogen, or nitrous oxide, the gas being operable upon being shaken vigorously with the liquid content in the container to become incorporated therein as a gaseous overrun. In the preferred embodiment of the invention the volume of the head space is approximately 65% of the volume of the liquid content in the container. Also according to the preferred embodiment, the gas normally occupies the head space at substantially atmospheric pressure.

Another object of the invention is to provide a ready-to-use or packaged food product of the type hereinabove alluded to. An important feature of the invention is that for so long as the contents remain aseptically sealed within the bottle, can or other container, the same may be shipped, stored, or stocked for sale at room temperatures without maintaining it under freezing or refrigeration temperatures. It is only just prior to the time that the product is to be opened and consumed that it should be chilled, preferably to about 27° F., and then shaken in the container prior to opening to cause the gas to be incorporated in the liquid body to aerate the latter. The chilling of the contents can be accomplished simply by placing the unopened container in the ice making compartment of a conventional home refrigerator or similar chilling refrigeration zone.

Another important feature of the invention is that it provides a ready to use packaged food product heretofore believed to be unavailable in the art of milk shakes. As a consequence, the present invention does not require either the separate purchase and use of ice cream, milk and flavoring, nor a mechanical mixing device, all of which is normally required to be on hand at the time of making a milk shake according to conventional practices.

A further feature of the preferred embodiment of the invention is that by providing a head space in the container for occupancy by the gas overrun, it is possible to aseptically can or bottle the product at atmospheric pressures and without the necessity of providing high pressure cans or other containers.

A milk shake product in accordance with the invention can be prepared according to the following procedural steps:

Initially, the desired milk shake mixture is prepared by mixing the various ingredients together as a liquid mass. The mixing may be done at room temperature, and the ingredients measured and mixed together by hand or by any suitable mixing apparatus well-known in the art. The specific formula of the mix may be varied according to taste, desired calorific content, flavor, texture and economic considerations. In general, and for purposes of illustrating the present invention, it may be assumed that the milk shake mix in the example herein is made according to either one of the two representative formulas of conventional fresh milk shakes hereinabove set forth in detail.

The liquid mix is sterilized and is then poured into sterile cans, bottles, or other containers. More specifically, the liquid milk shake is sterilized to destroy bacteria and enzymes normally leading to food spoilage by subjecting the same to high temperatures of short duration and according to flash heat sterilization methods and techniques well known in the food and canning industry. For specific instruction in the art, reference is made to U.S. Patent No. 2,549,216 entitled Apparatus and Method for Preserving Products in Sealed Containers dated April 17, 1951. Simultaneously with, or shortly after sterilization of the liquid mix, it is poured into pre-sterilized cans or other containers again according to techniques and with equipment well known in the art. In the preferred practice of the invention, each container is filled with the liquid mix to about 60% of the total volume of the container.

Before the container is sealed, the head space (comprising about 40% by volume of the container) left between the liquid level in the container and the top opening thereof is purged from air and substantially all oxygen content, and is filled with or replaced with a preferably tasteless and odorless inert or non-oxidizing gas such as nitrogen or nitrous oxide. With the container disposed in a non-oxidizing gas atmosphere, a sterilized lid or closure is applied and tightly sealed to the container again according to canning and bottling methods available in the art.

As previously indicated, a canned milk shake product of the type specified herein, because it is sterilized and hermetically sealed, may be shipped and stored for prolonged periods of time at room temperature. Thus, special handling problems, such as having to maintain the product frozen or under refrigeration are entirely avoided. It is contemplated that the consumer would purchase the product from a grocery shelf or similar stock, and prior to consumption, would place the receptacle in a refrigerator or other cooling chamber. Ideally, the product should be chilled to a temperature of 27° F. which is considered by many to be optimum temperature of a freshly made and properly mixed milk shake.

Just prior to opening the container, the consumer should vigorously shake the same to cause the non-oxidizing gas normally occupying the head space to be reincorporated within the liquid milk shake mix as a gaseous overrun. After shaking, the lid of the container would be removed and the contents would be ready for immediate consumption.

Although the foregoing invention has been described in same detail by way of illustration and example for purposes of clarity of understanding, it is understood that certain changes and modifications may be practiced within the spirit of the invention as limited only by the scope of the appended claims.

In the claims:

1. A method of preparing a milk shake for consumption comprising the steps of: providing a liquid milk shake mix; partially filling an open top container with said liquid mix to a level generally between 50–70% of the total volume of the container; filling the head space between the liquid level of the mix and the top opening of the container with a non-oxidizing gas at substantially atmospheric pressure; hermetically sealing the top opening of the container; chilling the container and contents to substantially below room temperature; vigorously shaking the chilled container to cause the non-oxidizing gas to be incorporated in the liquid mix as an aerating gaseous overrun but without increasing the internal gas pressure within said sealed container; then opening the container for substantially immediate consumption after shaking.

2. The method of claim 1 and including the steps of sterilizing the liquid mix and container prior to hermetically sealing the latter.

References Cited in the file of this patent

UNITED STATES PATENTS

| | | |
|---|---|---|
| 625,280 | Walker | May 16, 1899 |
| 994,641 | Hansen | June 6, 1911 |
| 1,403,223 | Arnoldi | Jan. 10, 1922 |
| 1,589,192 | Manchester | June 15, 1926 |
| 1,912,439 | Feller | June 6, 1933 |
| 2,073,273 | Wetstein | Mar. 9, 1937 |
| 2,120,297 | Reinecke | June 14, 1938 |
| 2,137,916 | Kleerup | Nov. 22, 1938 |
| 2,212,379 | Smith | Aug. 20, 1940 |
| 2,217,678 | Goosmann | Oct. 15, 1940 |
| 2,761,780 | Stewart | Sept. 4, 1956 |
| 2,849,323 | Young | Aug. 26, 1958 |
| 2,927,028 | Miller | Mar. 1, 1960 |

OTHER REFERENCES

Food Industries, September 1949, pp. 37, 38, 190 and 192, 1189, 1190, 1342 and 1344.